United States Patent

Covone

[11] Patent Number: 5,771,721
[45] Date of Patent: Jun. 30, 1998

[54] VEHICULAR ANTI-THEFT DEVICE

[76] Inventor: William F. Covone, 133 Elm St. Apt. BMST, West Haven, Conn. 06516

[21] Appl. No.: 922,136

[22] Filed: Aug. 28, 1997

[51] Int. Cl.⁶ ................................................. B60R 25/02
[52] U.S. Cl. .............................. 70/209; 70/226; 74/558; 74/558.5
[58] Field of Search ............................ 70/207, 209, 211, 70/212, 225, 226, 237, 238; 74/558, 558.5

[56] References Cited

U.S. PATENT DOCUMENTS 1,329,913  2/1920  McGuire .................................... 70/212
1,395,532  11/1921 Tilden ....................................... 70/209
5,450,736  9/1995  Volkmar .................................. 70/238 X
5,461,891  10/1995 Noel ........................................ 70/237 X
5,548,983  8/1996  Hart ......................................... 70/237 X
5,613,384  3/1997  Weber et al. ............................. 70/209

*Primary Examiner*—Lloyd A. Gall

[57] ABSTRACT

A vehicle theft prevention device is provided for use with a steering wheel assembly including a central portion with an airbag situated therein and an annular wheel with a generally circular cross-section coupled about the central portion in coplanar relationship therewith. Four linear members are interconnected at ends thereof and encompass the wheel of the steering wheel to abut a dash or windshield of the vehicle thereby precluding the rotation thereof.

5 Claims, 2 Drawing Sheets

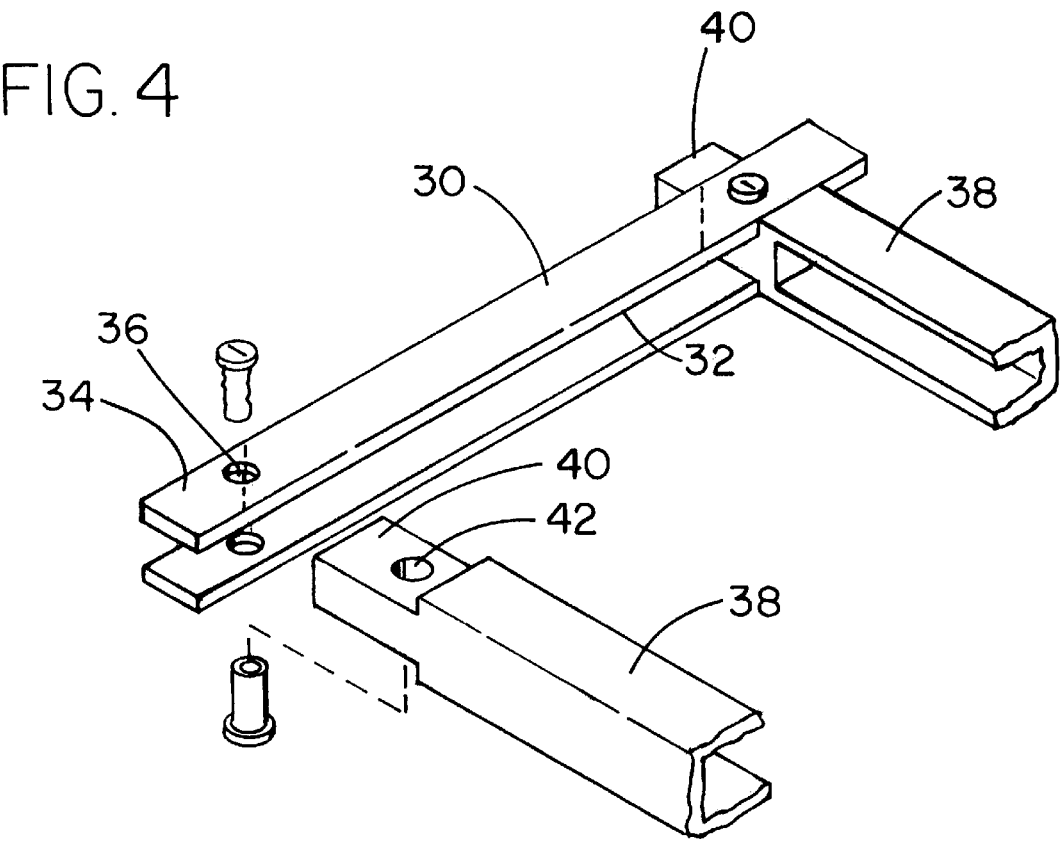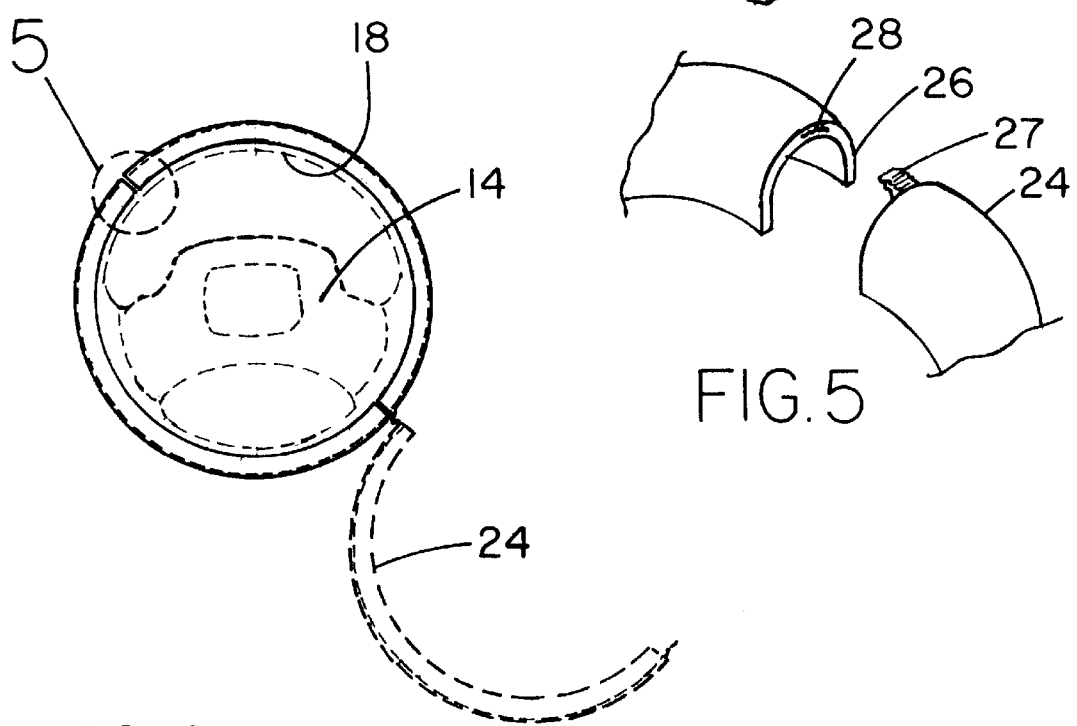

VEHICULAR ANTI-THEFT DEVICE

BACKGROUND OF THE INVENTION

1. Field of the Invention

The present invention relates to steering wheel mounted theft prevention mechanisms and more particularly pertains to a new vehicular anti-theft device for preventing the use of a steering wheel of a vehicle and further preventing the theft and use of an air bag thereof.

2. Description of the Prior Art

The use of steering wheel mounted theft prevention mechanisms is known in the prior art. More specifically, steering wheel mounted theft prevention mechanisms heretofore devised and utilized are known to consist basically of familiar, expected and obvious structural configurations, notwithstanding the myriad of designs encompassed by the crowded prior art which have been developed for the fulfillment of countless objectives and requirements.

Known prior art steering wheel mounted theft prevention mechanisms include U.S. Pat. No. 5,275,030; U.S. Pat. No. 3,982,602; U.S. Pat. No. 5,239,849; U.S. Pat. Des. No. 352,490; U.S. Pat. No. 5,115,652; and U.S. Pat. No. 4,738,127.

In these respects, the vehicular anti-theft device according to the present invention substantially departs from the conventional concepts and designs of the prior art, and in so doing provides an apparatus primarily developed for the purpose of preventing the use of a steering wheel of a vehicle and further preventing the theft and use of an air bag thereof.

SUMMARY OF THE INVENTION

In view of the foregoing disadvantages inherent in the known types of steering wheel mounted theft prevention mechanisms now present in the prior art, the present invention provides a new vehicular anti-theft device construction wherein the same can be utilized for preventing the use of a steering wheel of a vehicle and further preventing the theft and use of an air bag thereof.

The general purpose of the present invention, which will be described subsequently in greater detail, is to provide a new vehicular anti-theft device apparatus and method which has many of the advantages of the steering wheel mounted theft prevention mechanisms mentioned heretofore and many novel features that result in a new vehicular anti-theft device which is not anticipated, rendered obvious, suggested, or even implied by any of the prior art steering wheel mounted theft prevention mechanisms, either alone or in any combination thereof.

To attain this, the present invention generally comprises a steering wheel assembly with a central portion with an airbag situated therein. An annular wheel with a generally circular cross-section is coupled about the central portion in coplanar relationship therewith. Next provided is a circular disk-shaped shield with a semisperical protrusion formed in a central extent thereof. A diameter of the shield is greater than that of the wheel of the steering wheel assembly. Further, a diameter of the protrusion is equal to that of the central portion of the steering wheel assembly. With reference in particular to FIGS. 5 & 6, a wheel cover is provided having an annular configuration. The wheel cover includes a pair of halves with a pair of first ends hingeably coupled. A pair of second ends are releasably coupled with respect to each other for defining a torroid. The wheel cover has one of the halves thereof coupled to the shield. The cover is equipped with an open inner periphery for being situated about the wheel of the steering wheel assembly when the second ends of the halves thereof are coupled. As best shown in FIG. 4, a first pair of interconnection members are included each having a rectilinear configuration with four rectangular faces. One of the rectangular faces has a rectangular recess formed therein along a length thereof. Each of the first pair of interconnection members further has ends each with a pair of parallel rectangular tabs integrally coupled thereto. Such tabs extend in collinear alignment with the associated interconnection member and in coplanar relationship with a pair of opposite faces of the associated interconnection member. It should be noted that neither of the opposite faces are of the interconnection member with the rectangular recess formed therein. Each pair of tabs define a slot and have a pair of coaxial apertures formed therein. Associated therewith is a second pair of interconnection members each having a rectilinear configuration with four rectangular faces. One of the rectangular faces has a rectangular recess formed therein along a length thereof. Each of the second pair of interconnection members further has ends each with a rectilinear post integrally coupled thereto and extending in collinear alignment with the associated interconnection member. A cross-sectional area of the post is less than that of the interconnection member. Similar to the tabs of the first pair of interconnection member, each post has an aperture formed therein. In use, the wheel cover is situated about the wheel of the steering wheel assembly whereafter the interconnection members are situated to define a square. When such square is defined, the posts of each of the second interconnection members are situated within the slots of the first interconnection members such that the apertures thereof are in alignment. When the members are in such orientation, situated within the recesses of each of the interconnection members is a periphery of the shield. For precluding the removal of the shield and interconnection members, a plurality of pins are locked within the aligned apertures.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicular anti-theft device apparatus and method which has many of the advantages of the steering wheel mounted theft prevention mechanisms mentioned heretofore and many novel features that result in a new vehicular anti-theft device which is not anticipated, rendered obvious, suggested, or even implied by any of the prior art steering wheel mounted theft prevention mechanisms, either alone or in any combination thereof.

It is another object of the present invention to provide a new vehicular anti-theft device which may be easily and efficiently manufactured and marketed.

It is a further object of the present invention to provide a new vehicular anti-theft device which is of a durable and reliable construction.

An even further object of the present invention is to provide a new vehicular anti-theft device which is susceptible of a low cost of manufacture with regard to both materials and labor, and which accordingly is then susceptible of low prices of sale to the consuming public, thereby making such vehicular anti-theft device economically available to the buying public.

Still yet another object of the present invention is to provide a new vehicular anti-theft device which provides in the apparatuses and methods of the prior art some of the advantages thereof, while simultaneously overcoming some of the disadvantages normally associated therewith.

Still another object of the present invention is to provide a new vehicular anti-theft device for preventing the use of a steering wheel of a vehicle and further preventing the theft and use of an air bag thereof.

Even still another object of the present invention is to provide a new vehicular anti-theft device that includes a steering wheel assembly having a central portion with an airbag situated therein and an annular wheel with a generally circular cross-section coupled about the central portion in coplanar relationship therewith. Four linear members are interconnected at ends thereof and encompass the wheel of the steering wheel to abut a dash or windshield of the vehicle thereby precluding the rotation thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a close-up view of the interconnection members of the present invention.

FIG. 5 is a view of the second ends of the wheel cover of the present invention.

FIG. 6 is a front view of the wheel cover of the present invention.

DESCRIPTION OF THE PREFERRED EMBODIMENT

Figure 1:
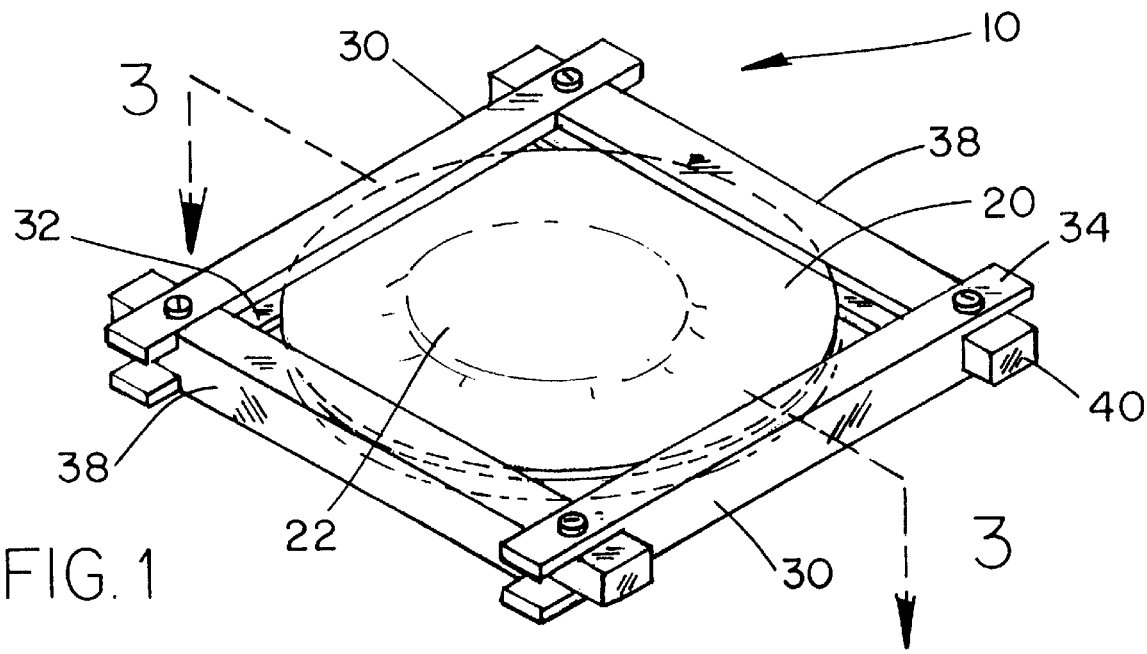
FIG. 1 is a perspective view of a new vehicular anti-theft device according to the present invention.
Figure 2:
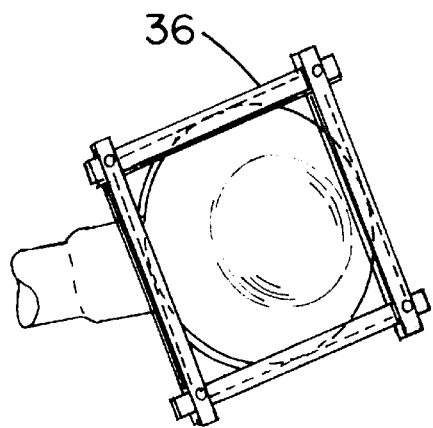
FIG. 2 is a perspective view of the present invention in use.
Figure 3:
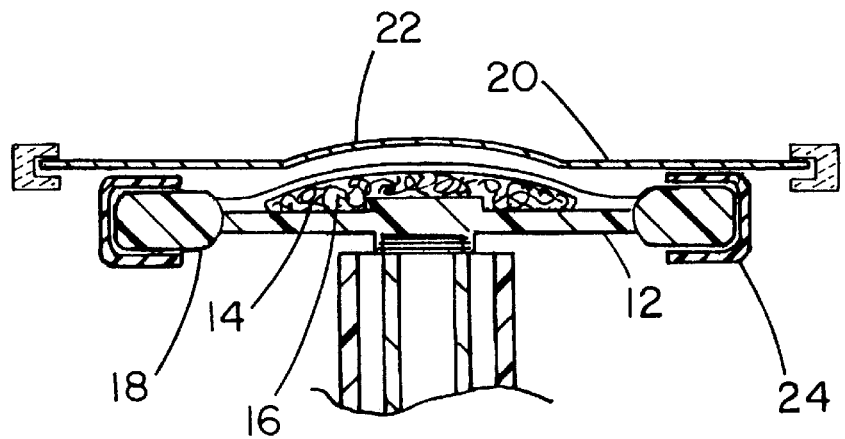
FIG. 3 is a cross-sectional view of the present invention.

With reference now to the drawings, and in particular to FIGS. 1 through 6 thereof, a new vehicular anti-theft device embodying the principles and concepts of the present invention and generally designated by the reference numeral 10 will be described.

The system designated as numeral 10 includes a steering wheel assembly 12 with a central portion 14 having an airbag 16 situated therein. An annular wheel 18 with a generally circular cross-section is coupled about the central portion in coplanar relationship therewith.

Next provided is a circular disk-shaped shield 20 with a semisperical protrusion 22 formed in a central extent thereof for defining a recess on an inner surface thereof. A diameter of the shield is greater than that of the wheel of the steering wheel assembly. Further, a diameter of the protrusion is equal to that of the central portion of the steering wheel assembly.

With reference in particular to FIGS. 5 & 6, a wheel cover 24 is provided having an annular configuration. The wheel cover includes a pair of halves with a pair of first ends hingeably coupled. A pair of second ends 26 are releasably coupled with respect to each other for defining a torroid. Such is accomplished by way of a locking tab 27 and recess 28. Note FIG. 5. Preferably, the second ends 26 are further equipped with means such as a pair of eyelets for attaching a locking mechanism thereto for the purpose of precluding the unauthorized removal of the wheel cover. The wheel cover has one of the halves thereof coupled to the shield. The cover is equipped with an open inner periphery for being tightly situated about the wheel of the steering wheel assembly when the second ends of the halves thereof are coupled.

As best shown in FIG. 4, a first pair of interconnection members 30 are included each having a rectilinear configuration with four rectangular faces. One of the rectangular faces has a rectangular recess 32 formed therein along a length thereof. Each of the first pair of interconnection members further has ends each with a pair of parallel rectangular tabs 34 integrally coupled thereto. Such tabs extend in collinear alignment with the associated interconnection member and in coplanar relationship with a pair of opposite faces of such associated interconnection member. Each pair of tabs define a slot and have a pair of coaxial apertures 36 formed therein.

Associated therewith is a second pair of interconnection members 38 each having a rectilinear configuration with four rectangular faces. One of the rectangular faces has a rectangular recess formed therein along a length thereof. Each of the second pair of interconnection members further has ends with a rectilinear post 40 integrally coupled thereto and extending in collinear alignment with the associated interconnection member. A cross-sectional area of the post is less than that of the interconnection member. Similar to the tabs of the first pair of interconnection members, each post has an aperture 42 formed therein.

In use, the wheel cover is situated about the wheel of the steering wheel assembly whereafter the interconnection members are situated to define a square. When such square is defined, the posts of each of the second interconnection members are situated within the slots of the first interconnection members such that the apertures thereof are in alignment. When the members are in such orientation, a periphery of the shield is situated within the recesses of each of the interconnection members. For precluding the removal of the shield and interconnection members, a plurality of pins are locked within the aligned apertures. It should be understood that, in its operative orientation, the shield precludes the theft of the air bag and the interconnection members preclude rotation of the steering wheel by abutting either the dash or the window of the vehicle. This abutment occurs at the ends of the interconnection members. As an option, one of the interconnection members may be extended to facilitate such abutment.

The aforementioned pins preferably take the form of rivets with male and female components. Note FIG. 4. The male components are adapted to only disengage the female component upon the insertion of a key within a slot formed within an end of the male component and the subsequent rotation thereof. It should be noted that the pins may utilize any sort of locking means including a member on an outer surface of the male components which removably engages a slot formed in an inner surface of the female components.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle theft prevention device comprising, in combination:
   a steering wheel assembly including a central portion with an airbag situated therein and an annular wheel with a generally circular cross-section coupled about the central portion in coplanar relationship therewith;
   a circular disk-shaped shield with a semisperical protrusion formed in a central extent of the disk and extending outwardly therefrom, a diameter of the shield greater than that of the wheel of the steering wheel assembly and a diameter of the protrusion equal to that of the central portion of the steering wheel assembly;
   a wheel cover having an annular configuration and including a pair of halves with one of the halves coupled to the shield, the halves having a pair of first ends hingeably coupled and a pair of second ends releasably coupled with respect to each other for defining a torroid with an open inner periphery for being situated about the wheel of the steering wheel assembly when the second ends of the halves thereof are coupled;
   a first pair of interconnection members each having a rectilinear configuration with four rectangular faces, one of the rectangular faces having a rectangular recess formed therein along a length thereof, each of the first pair of interconnection members further having ends each with a parallel pair of rectangular tabs integrally coupled thereto and extending in collinear alignment with the associated interconnection member and in coplanar relationship with a pair of opposite faces of the associated interconnection member not including that with the rectangular recess formed therein, each pair of tabs defining a slot and having a pair of coaxial apertures formed therein;
   a second pair of interconnection members each having a rectilinear configuration with four rectangular faces, one of the rectangular faces having a rectangular recess formed therein along a length thereof, each of the second pair of interconnection members further having ends each with a rectilinear post integrally coupled thereto and extending in collinear alignment with the associated interconnection member with a cross-sectional area less than that of the interconnection member, each post having an aperture formed therein;
   whereby said wheel cover is situated about the wheel of the steering wheel assembly and the interconnection members are situated to define a square wherein the posts of each of the second interconnection members are situated within the slots of the first interconnection members such that the apertures thereof are in alignment, wherein a periphery of the shield is situated within the recesses of each of the interconnection members and a plurality of pins are locked within the aligned apertures for precluding the removal thereof.

2. A vehicle theft prevention device for:
   steering wheel assembly including a central portion and an annular wheel with a generally circular cross-section coupled about the central portion in coplanar relationship therewith; comprising
   at least three linear members interconnected at ends thereof for encompassing the wheel of the steering wheel assembly thereby precluding the rotation thereof
   a generally circular-shaped shield for covering the central portion of the steering wheel assembly; the linear members each including a recess in an inner face thereof receiving a portion of the outer periphery of the shield, and locking the shield on the steering wheel assembly.

3. A vehicle theft prevention device as set forth in claim 2 wherein the linear members are interconnected via locking pins.

4. A vehicle theft prevention device as set forth in claim 2 wherein the shield has a semisperical protrusion formed in a central extent thereof.

5. A vehicle theft prevention device as set forth in claim 2 wherein a diameter of the shield is greater than that of the wheel of the steering wheel assembly.

* * * * *